United States Patent [19]
Jacobson et al.

[11] 4,339,424
[45] Jul. 13, 1982

[54] METHOD OF PREPARING W OR MO METAL OXIDES

[75] Inventors: Allan J. Jacobson, Princeton; Kent H. Cheng, Thorofare; M. Stanley Whittingham, Fanwood, all of N.J.

[73] Assignee: Exxon Research & Engineering Co., FLorham Park, N.J.

[21] Appl. No.: 245,965

[22] Filed: Mar. 20, 1981

[51] Int. Cl.$^3$ .................. C01G 39/02; C01G 41/02
[52] U.S. Cl. .................................. 423/606; 423/58; 423/61; 423/593
[58] Field of Search ............... 423/56, 581, 61, 593, 423/606

[56] References Cited

U.S. PATENT DOCUMENTS

3,848,049  11/1974  Ronzio et al. ........................ 423/56
4,080,421  3/1978  Kasserra ............................ 423/56 X

FOREIGN PATENT DOCUMENTS

48-42358  12/1973  Japan ................................. 423/606

OTHER PUBLICATIONS

R. G. Dickens et al., Trans. Faradaz Soc., vol. 67, pp. 794-800, (1971).

L. Kihlborg et al., Mat. Res. Bull., vol. 14, pp. 667-674, (1979).

T. A. Bither et al., Inorg. Chem., vol. 5, pp. 1159-1562, (1966).

J. Graham et al., Acta Cryst., vol. 14, pp. 379-383, (1961).

B. Gerand et al., J. Solid State Chem., vol. 29, pp. 429-434, (1979).

M. Figlarz et al., 9th International Symposium Reactivity of Solids, Cracow, VI-18, pp. 660-664, (1980).

*Primary Examiner*—Earl C. Thomas
*Attorney, Agent, or Firm*—James H. Takemoto

[57] ABSTRACT

A process for preparing W, Mo or mixed metal oxides thereof by oxidizing a reduced metal oxide of the formula $(NH_mR_{4-m})_q{}^+MO_p$ where each R is independently $C_1$-$C_{20}$ aliphatic, $C_7$-$C_{14}$ araliphatic or $C_3$-$C_8$ cycloaliphatic with the proviso that adjacent R's, together with the nitrogen atom to which they are attached, may form a 5, 6 or 7 membered heterocyclic ring, m is an integer from 0 to 4, q is a number from about 0.001 to $\frac{1}{3}$, M is W or Mo and p is a number from 2 to 3 with aqueous hydrogen peroxide. The so-treated reduced metal oxide is isolated and heated in an oxygen containing atmosphere to form metal oxides of the formula $MO_p$.

10 Claims, No Drawings

METHOD OF PREPARING W OR MO METAL OXIDES

BACKGROUND OF THE INVENTION

This invention relates to a method of preparing oxides of W, Mo or mixed metal oxides thereof. More particularly, a reduced metal oxide containing an ammonium or substituted ammonium cation is treated with aqueous hydrogen peroxide, followed by heat treatment in an oxygen containing atmosphere.

Tungsten and molybdenum bronzes are known in the art. These bronzes contain metal cations and have different structures such as pervoskite, tetragonal, intergrowth and hexagonal. Bronzes having a hexagonal structure are of particular interest due to the formation of hexagonal tunnels. It has been presumed that the metal cations occupy the tunnel sites thus imparting stability to the overall structure. Hexagonal ammonium tungsten bronzes are described in Trans. Faraday Soc., 67, 794 (1971). These compounds are prepared by reducing ammonium paratungstate in a hydrogen atmosphere. The structures of alkali metal hexagonal tungsten bronzes which are prepared by heating alkali tungstate, tungsten dioxide and tungsten trioxide in vacuo are reported in Mat. Res. Bull., 14, 667 (1979). According to Inorg. Chem., 5, 1559 (1966), a rubidium molybdenum bronze having a hexagonal structure was prepared by heating $Rb_2MoO_4$, $MoO_3$ and Mo at high temperatures.

In 1961, it was discovered that a hexagonal tungsten bronze structure could be obtained with vacant tunnel sites in mixed molybdenum-tungsten oxide compounds wherein Mo atoms replaced some W atoms in the oxide framework (Acta. Cryst., 14, 379 (1961)). A recent series of papers reports the synthesis and properties of pure hexagonal $WO_3$ with vacant tunnel sites, 9th Int. Cong. on Electron Microscopy, 1, 260, (Toronto, 1978); J. Solid State Chem., 29, 429 (1979); 9th Int. Symp. Reactivity of Solids, VI-18, 660 (Cracow, 1980). The reported synthesis is represented schematically as

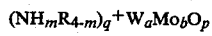

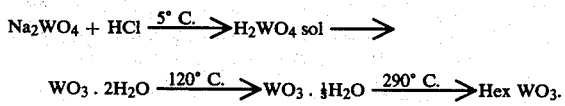

SUMMARY OF THE INVENTION

It has been discovered that metal oxides of W, Mo or mixed metal oxides thereof may be produced in a simple manner by oxidizing a reduced metal oxide containing an ammonium or substituted ammonium cation. The process of the invention for preparing a metal oxide of the formula $MO_p$ where M is W or Mo and p is a number from 2 to 3 comprises contacting a reduced metal oxide of the formula $(NH_mR_{4-m})_q{}^+MO_p$ where each R is independently $C_1$-$C_{20}$ aliphatic, $C_7$-$C_{14}$ araliphatic or $C_3$-$C_8$ cycloaliphatic with the proviso that adjacent R's, together with the nitrogen atom to which they are attached, may form a 5, 6 or 7 membered heterocyclic ring, m is an integer from 0 to 4 and q is a number from about 0.001 to ⅓ with aqueous hydrogen peroxide, separating the so-treated reduced metal oxide and heating the separated metal oxide in an oxygen containing atmosphere. The present process may also be used to make mixed metal oxides. Accordingly, a mixed metal oxide of the formula $W_aMo_bO_p$ where a and b are numbers whose sum is 1 can be produced by treating a reduced metal oxide of the formula $$(NH_mR_{4-m})_q{}^+W_aMo_bO_p$$

R, m, q, a, b and p being defined above, with aqueous hydrogen peroxide, separating the so-treated reduced metal oxide and heating the separated metal oxide in an oxygen containing atmosphere.

The present process is especially useful for preparing metal oxides having a tunnel structure, particularly structures related to that of hexagonal tungsten bronze. Metal oxides having the hollandite related structures may also be prepared.

DETAILED DESCRIPTION OF THE INVENTION

Reduced metal oxides containing ammonium or substituted ammonium cations used as starting materials have the formula $(NH_mR_{4-m})_q{}^+MO_p$ where m is 0 to 4, R is preferably $C_1$-$C_{10}$ and especially $C_1$-$C_6$ alkyl, or adjacent R's may join together with the nitrogen to which they are attached to form 5 and 6 membered heterocyclic rings, particularly pyridinium, q ranges from about 0.001 to ⅓, M is W or Mo and p is preferably 3. The above-cited reduced metal oxides may be prepared by known methods, e.g., by heating ammonium or substituted ammonium salts of polytungstate or polymolybdate acids in a reducing atmosphere such as a hydrogen containing atmosphere. Suitable tungstate and molybdate salts include ammonium paratungstate $((NH_4)_{10}W_{12}O_{41}.5H_2O)$, ammonium paramolybdate $((NH_4)_6Mo_7O_{24}.4H_2O)$, $(pyridinium)_2Mo_3O_{10}$, $(CH_3NH_3)_2Mo_2O_7$, $(CH_3)_2NH_2Mo_4O_{13}$, $(C_2H_5)_2NH_2Mo_4O_{13}$, $[(n-C_4H_9)_4N]_2W_6O_{19}$ and $[(n-C_4H_9)_4N]_4W_{10}O_{32}$. Starting materials having the formula $(NH_mR_{4-m})_q{}^+W_aMo_bO_p$ where m, R, q, a, b and p are defined above are prepared by heating a mixed ammonium or substituted ammonium salt containing both molybdenum and tungsten in a reducing atmosphere.

The reduced metal oxides containing ammonium or substituted ammonium cations are treated with an aqueous solution of hydrogen peroxide. Hydrogen peroxide solutions commercially available at strengths ranging from 50% to 3% are suitable. The rate of oxidation and hence the reaction time is a function of the strength of the peroxide employed as oxidizing agents. In the case of an ammonium tungsten bronze of the formula $(NH_4)_xWO_3$ where x is a number ≦⅓, reaction is evidenced by a color reaction is evidenced by a color change from blue to white.

After oxidation is complete, the resulting solid is isolated from solution. The precise indentity of this solid is not known, although infrared spectroscopic studies indicate that ammonium cations are still present.

The isolated solid product is then heated in oxygen or an oxygen containing atmosphere. The temperatures range from about 200° to about 400° C., preferably 250° to 350° C. During the course of heating, water and ammonia are driven off and anhydrous products having the formulae $MO_p$ or $W_aMo_bO_p$ are formed. Examples of anhydrous metal oxides include $WO_3$, $MoO_3$ and $W_{0.5}Mo_{0.5}O_3$. It should be noted that the structural modification of the metal oxide may be a function of the final temperature employed during heating in an oxygen or oxygen containing atmosphere. Thus it is possible to isolate different crystalline modifications of the same metal oxide composition depending on the final temperature employed.

A preferred application of the present process is the synthesis of metal oxides having a hexagonal bronze structure wherein the tunnel sites resulting from the hexagonal structure are vacant. It has only recently been reported that hexagonal $WO_3$ having vacant tunnel sites can be prepared (Gerand and Figlarz, 9th Int. Cong. on Electron Microscopy, J. M. Sturgen ed, 1, 260 (1978, Toronto). As noted previously, the reported synthesis is complicated and involves the formation of a tungstic acid sol by mixing $Na_2WO_4$ and HCl at low temperature. The sol is ripened to a dihydrate which is then hydrothermally treated at 120° C. to form $WO_3 \cdot \frac{1}{3} H_2O$. A final isothermal dehydration at 290° C. forms hexagonal $WO_3$.

In contrast, the process of the invention treats a hexagonal ammonium tungsten bronze with hydrogen peroxide followed by heat treatment in an oxygen atmosphere. This is represented by the following equation:

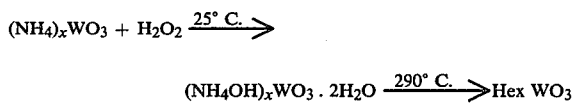

$$(NH_4)_xWO_3 + H_2O_2 \xrightarrow{25° C.}$$

$$(NH_4OH)_xWO_3 \cdot 2H_2O \xrightarrow{290° C.} Hex\ WO_3$$

where $x \leq \frac{1}{3}$. Ammonium tungsten bronze is a dark blue solid. Upon treatment with 30% $H_2O_2$, a white product is formed which is then heat treated as shown. The resulting hexagonal $WO_3$ exhibits the same x-ray diffraction pattern and lattice parameters as reported in the literature. Above about 540° C., hexagonal $WO_3$ is transformed to a $ReO_3$ related structure.

The preparation of metal oxides having a hexagonal structure with vacant tunnel sites is advantageous because it offers a simple synthetic path to bronzes having different cations in the tunnel sites. For example, hexagonal $WO_3$ can be treated with potassium or sodium benzophenone to yield potassium or sodium bronzes, and with n-butyl lithium to yield lithium tungsten bronzes. These materials are dark colored, so that the reactions may be used as the basis for an electrochromic display. They may also be used in a battery. Hexagonal bronzes have heretofore only been accessible by high temperature or high pressure and high temperature synthetic routes.

The process of the invention is further illustrated by the following examples.

EXAMPLE 1

Hexagonal ammonium tungsten bronze $(NH_4)_{1/6}WO_3$ was prepared by reduction of ammonium paratungstate $(NH_4)_{10}W_{12}O_{41} \cdot 5H_2O$ in 10% $H_2$/90% He for two hours at 350° C. A dark blue product is obtained which shows a band at about 1400 cm$^{-1}$ in the infrared spectrum characteristic of $NH_4^+$. The ammonium bronze is treated at room temperature with a 30% aqueous solution of hydrogen peroxide. Reaction is evidenced by the slow disappearance of the dark blue color of the bronze and the formation of a white product. The product at this stage also shows a strong ammonium band in the infrared. X-ray powder diffraction shows the hexagonal structure is unchanged apart from a small change in lattice parameters to a=7.341 c=7.652 A (cf $(NH_4)_{.166} WO_3$ a=7.388 c=7.551 A). Heating the product at 350° C. in an oxygen flow for 16 hours removes ammonia and water. Loss of ammonia and water, and formation of hexagonal $WO_3$ is evidenced by the disappearance of the 1400 cm$^{-1}$ band in the infrared and a further small change in the lattice parameters to a=7.317 c=3.902 A in agreement with those reported by Figlarz et al. Thermogravimetric analysis of the final hexagonal $WO_3$ white product shows no weight loss in oxygen to 700° C. indicating complete removal of the ammonium cations.

EXAMPLE 2

Ammonium paratungstate and ammonium paramolybdate, $(NH_4)_6Mo_7O_{24} \cdot 4H_2O$, were dissolved in warm water. A mixed ammonium molybdenum tungsten polyanion was precipitated from this solution by addition of 95% ethanol. The precipitate was treated as described in Example 1 and was heated in 10% $H_2$/90% He for two hours at 350° C. resulting in $(NH_4)_{\frac{1}{6}}Mo_{0.15}W_{0.85}O_3$ which was then reacted with 30% aqueous $H_2O_2$ to give a white solid. Finally, the white solid was treated at 320° C. in flowing oxygen for 14 hours. X-ray powder diffraction of the final $Mo_{0.15}W_{0.85}O_3$ product confirmed that the structure was hexagonal with lattice parameters a=7.354 c=7.674 A.

The infrared spectrum of the final white product showed no 1400 cm$^{-1}$ band due to ammonium and thermogravimetric analysis in oxygen showed no weight loss of 700° C. indicating complete removal of the cations.

What is claimed is:

1. A process for preparing a metal oxide having a hexagonal tungsten bronze structure, said oxide having the formula $MO_p$ where M is W or Mo and p is a number from 2 to 3 which comprises contacting a reduced metal oxide of the formula $(NH_mR_{4-m})_q^+MO_p$ where each R is independently $C_1$-$C_{20}$ aliphatic, $C_7$-$C_{14}$ araliphatic or $C_3$-$C_8$ cycloaliphatic with the proviso that adjacent R's, together with the nitrogen atom to which they are attached, may form a 5, 6 or 7 membered heterocyclic ring, m is an integer from 0 to 4, p is a number from 2 to 3 and q is a number from about 0.001 to $\frac{1}{3}$ with aqueous hydrogen peroxide, separating the so-treated reduced metal oxide and heating the separated metal oxide in an oxygen containing atmosphere at temperatures of from about 200° to about 400° C.

2. The process of claim 1 wherein M is W.
3. The process of claim 1 wherein M is Mo.
4. The process of claim 1 wherein p is 3.
5. The process of claim 1 wherein m is 4.
6. The process of claim 1 wherein R is $C_1$-$C_{10}$ alkyl.
7. The process of claim 1 wherein two adjacent R's together with the nitrogen to which they are attached form a 6 membered heterocyclic ring.
8. The process of claim 1 wherein the reduced metal oxide is prepared from ammonium paratungstate or ammonium paramolybdate.
9. A process for preparing a metal oxide having a hexagonal tungsten bronze structure, said oxide having the formula $W_aMo_bO_p$ where a and b are numbers whose sum is 1 and p is a number from 2 to 3 which comprises contacting a reduced metal oxide of the formula $(NH_mR_{4-m})_q^+W_aMo_bO_p$ where R is independently $C_1$-$C_{20}$ aliphatic, with the proviso that adjacent R's, together with the nitrogen atom to which they are attached, may form a 5, 6 or 7 membered heterocyclic ring, m is an integer from 0 to 4, a and b are numbers whose sum is 1, p is a number from 2 to 3 and q is a number from about 0.001 to $\frac{1}{3}$ with aqueous hydrogen peroxide, separating the so-treated reduced metal oxide and heating the separated metal oxide in an oxygen containing atmosphere at temperatures of from about 200° to about 400° C.

10. A process for preparing $WO_3$ having a hexagonal tungsten bronze structure which comprises contacting a reduced metal oxide of the formula $(NH_mR_{4-m})_q{}^+WO_3{}^-$ where each R is independently $C_1$–$C_{20}$ aliphatic, with the proviso that adjacent R's, together with the nitrogen atom to which they are attached, may form a 5, 6 or 7 membered heterocyclic ring, m is an integer from 0 to 4 and q is a number from about 0.001 to $\frac{1}{3}$ with aqueous hydrogen peroxide, separating the so-treated reduced metal oxide and heating the separated metal oxide in an oxygen containing atmosphere.

* * * * *